(12) United States Patent
Mishra et al.

(10) Patent No.: US 11,790,170 B2
(45) Date of Patent: Oct. 17, 2023

(54) CONVERTING UNSTRUCTURED TECHNICAL REPORTS TO STRUCTURED TECHNICAL REPORTS USING MACHINE LEARNING

(71) Applicants: Chevron U.S.A. Inc., San Ramon, CA (US); CALIFORNIA INSTITUTE OF TECHNOLOGY, Pasadena, CA (US)

(72) Inventors: Asitang Mishra, Los Angeles, CA (US); Shuxing Cheng, Houston, TX (US); Annie Didier, Pasadena, CA (US); Chris Mattmann, Pasadena, CA (US); Hamsa Shwetha Venkataram, Pasadena, CA (US); Grant Lee, Houston, TX (US); Wayne Moses Burke, Ann Arbor, MI (US); Vishal Lall, Los Angeles, CA (US)

(73) Assignees: CHEVRON U.S.A. INC., San Ramon, CA (US); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 109 days.

(21) Appl. No.: 16/740,066

(22) Filed: Jan. 10, 2020

(65) Prior Publication Data
US 2020/0226325 A1 Jul. 16, 2020

Related U.S. Application Data

(60) Provisional application No. 62/790,669, filed on Jan. 10, 2019.

(51) Int. Cl.
*G06F 40/295* (2020.01)
*G06N 20/00* (2019.01)
(Continued)

(52) U.S. Cl.
CPC ......... *G06F 40/295* (2020.01); *G06F 40/205* (2020.01); *G06F 40/284* (2020.01); *G06N 20/00* (2019.01); *G06F 40/30* (2020.01)

(58) Field of Classification Search
CPC .... G06F 40/295; G06F 40/284; G06F 40/205; G06F 40/30; G06F 17/2765; G06F 17/27;
(Continued)

(56) References Cited

U.S. PATENT DOCUMENTS 6,240,409 B1 * 5/2001 Aiken .................... G06F 40/194
9,495,357 B1 * 11/2016 Smyros ................. G06F 40/211
(Continued)

OTHER PUBLICATIONS

International Search Report and Written Opinion dated Apr. 16, 2020 for PCT/US2020/013164, filed Jan. 10, 2020.

*Primary Examiner* — Anne L Thomas-Homescu
(74) *Attorney, Agent, or Firm* — Sheppard, Mullin, Richter & Hampton LLP

(57) ABSTRACT

A computer-implemented, machine learning-based method of converting an unstructured technical report into a structured technical report includes obtaining an unstructured technical report, tokenizing the unstructured technical report into an n-gram array, identifying and filtering non-interesting n-grams from the first n-gram array based on common language usage of the non-interesting n-grams and a determination that the non-interesting n-grams do not appear on a confirmed technical entity database, generating and displaying a technical entity candidate list from the filtered n-gram array, displaying, obtaining, from a pattern matching model and/or a graphical user interface, an indication that a technical entity candidate is a technical entity of interest, appending the technical entity of interest to the confirmed technical entity database, generating and displaying a structured technical report with the confirmed technical entities
(Continued)

and corresponding technical entity value parameters, and iterating the process to refine the pattern matching model.

20 Claims, 12 Drawing Sheets

(51) Int. Cl.
*G06F 40/205* (2020.01)
*G06F 40/284* (2020.01)
*G06F 40/30* (2020.01)

(58) Field of Classification Search
CPC .............. G06F 17/30684; G06N 20/00; G06Q 30/0282
See application file for complete search history.

(56) References Cited

U.S. PATENT DOCUMENTS

| | | | |
|---|---|---|---|
| 9,715,625 B2* | 7/2017 | Stadermann | G06K 9/726 |
| 10,235,711 B1* | 3/2019 | Koduvayur Viswanathan | G06Q 30/0623 |
| 10,248,646 B1* | 4/2019 | Leibovitz | G06F 16/31 |
| 10,388,272 B1* | 8/2019 | Thomson | G10L 15/22 |
| 10,546,348 B1* | 1/2020 | Lesner | G06Q 40/02 |
| 11,133,094 B2* | 9/2021 | Tucker | G06F 16/248 |
| 2003/0033288 A1* | 2/2003 | Shanahan | G06F 16/3322 |
| 2003/0061200 A1* | 3/2003 | Hubert | G06Q 30/0601 |
| 2004/0243545 A1* | 12/2004 | Boone | G16Z 99/00 |
| 2007/0074131 A1* | 3/2007 | Assadollahi | G06F 40/242 715/236 |
| 2008/0059498 A1* | 3/2008 | Carus | G06F 16/355 |
| 2009/0193011 A1* | 7/2009 | Blair-Goldensohn | G06F 16/345 707/999.005 |
| 2009/0248669 A1* | 10/2009 | Shetti | G06F 16/3322 707/999.005 |
| 2010/0145720 A1* | 6/2010 | Reiner | G06Q 50/2057 705/2 |
| 2010/0290699 A1* | 11/2010 | Adam | G06V 20/00 382/155 |
| 2012/0179453 A1* | 7/2012 | Ghani | G06F 16/355 704/9 |
| 2013/0103397 A1* | 4/2013 | Almaer | G06F 16/24578 704/235 |
| 2014/0136541 A1* | 5/2014 | Farahat | G06F 16/958 707/740 |
| 2014/0172902 A1* | 6/2014 | Agarwal | G06F 16/3335 707/765 |
| 2014/0279763 A1* | 9/2014 | Madnani | G06N 20/00 706/12 |
| 2014/0344669 A1* | 11/2014 | Kawara | G06F 40/151 715/234 |
| 2015/0205858 A1* | 7/2015 | Xie | G06Q 50/01 707/755 |
| 2015/0227619 A1* | 8/2015 | Xie | G06F 16/958 707/706 |
| 2015/0309984 A1* | 10/2015 | Bradford | G06F 40/263 704/8 |
| 2015/0347383 A1* | 12/2015 | Willmore | G06F 40/274 704/9 |
| 2015/0355836 A1* | 12/2015 | Gummadidala | G06F 3/023 715/773 |
| 2016/0034512 A1* | 2/2016 | Singhal | G06F 16/35 707/737 |
| 2016/0041965 A1* | 2/2016 | Ghassabian | G06F 3/0237 715/261 |
| 2016/0063093 A1* | 3/2016 | Boucher | G06F 16/90324 707/748 |
| 2016/0063115 A1* | 3/2016 | Ayan | G06F 16/9535 707/722 |
| 2016/0078101 A1* | 3/2016 | Somaiya | G06F 16/3322 707/706 |
| 2016/0364428 A1* | 12/2016 | Harris | G06F 16/23 |
| 2017/0075996 A1* | 3/2017 | Azimi | G06F 16/951 |
| 2017/0169014 A1* | 6/2017 | Sotelo | G06Q 30/06 |
| 2017/0277946 A1 | 9/2017 | Stadermann et al. | |
| 2017/0344224 A1* | 11/2017 | Kay | G06F 3/0482 |
| 2018/0260860 A1* | 9/2018 | Devanathan | G06F 16/345 |
| 2018/0365323 A1* | 12/2018 | Doornenbal | G06F 16/335 |
| 2019/0286667 A1* | 9/2019 | Puzicha | G06F 40/166 |
| 2019/0286668 A1* | 9/2019 | Puzicha | G06F 16/93 |
| 2019/0294452 A1* | 9/2019 | Herring, Jr. | G06F 3/0482 |
| 2019/0294670 A1* | 9/2019 | Jagan | G06F 40/30 |
| 2019/0364011 A1* | 11/2019 | Nguyen | G06F 16/9535 |
| 2020/0243094 A1* | 7/2020 | Thomson | H04M 3/42382 |
| 2020/0342054 A1* | 10/2020 | Cason | G06F 40/211 |
| 2020/0387572 A1* | 12/2020 | Allen | G06N 3/0427 |

* cited by examiner

Aggregation of identified patterns:

Fig. 4

CONVERTING UNSTRUCTURED TECHNICAL REPORTS TO STRUCTURED TECHNICAL REPORTS USING MACHINE LEARNING

STATEMENT REGARDING FEDERALLY SPONSORED R&D

This invention was made with government support under Grant No. 80NM0018D004 awarded by NASA (JPL). The government has certain rights in the invention.

FIELD

The present disclosure relates generally to pattern recognition and more particularly to converting unstructured technical reports to structured technical reports using machine learning techniques.

BACKGROUND

Technical reports (e.g., engineering reports) may exist in unstructured format. For example, unstructured formats may include prose in paragraph form, diagrams, figures, or other content within a document that does not adhere to a formal and/or repeatable structure. The information available in technical reports is generally more usable in a structured format, such as a database, table, spreadsheet, or other repeatable and organized format. For example, structured report formats enable users to more readily locate, access, and use required information within the report and/or organize groups of reports. Structured report formats may further facilitate useful data analysis on information stored within groups of reports. Converting technical reports from an unstructured format to a structured format generally requires manual data entry, which is time consuming, inefficient, and prone to error and variation. This is particularly true with unstructured engineering reports that may include large variances in use of terminology and grammatical structure. For example, the information generally embedded within technical reports with unstructured formats may be difficult to extract and leverage relative to the information stored in structured formats. Thus, current methods are labor-intensive, unreliable, and time-consuming, particularly in scenarios in which the owner and/or user of the information must store, locate, and use information from a large number of technical reports.

SUMMARY

Embodiments of the present disclosure provide a computer-implemented and machine learning-based system for extracting information from unstructured technical reports and using that information to generate structured technical reports. For example, embodiments disclosed herein may be implemented to identify technical entities and build logical and technological relationships between these entities and their associated technical value parameters, as embedded in the unstructured technical reports. As used herein, the term technical entities refers to technical data classifications and/or parameter types, e.g., average pressure, maximum pressure, maximum rate, pipe length, pipe diameter, etc. As used herein, the term technical value parameters refers to the actual quantitative and/or qualitative expressions that relate to the Technical entities. For example, if the technical entity is average pressure, then the associated technical value parameter would be the numerical value for the average pressure.

Embodiments disclosed herein may be implemented to learn technical entity patterns and related relationships with technical entity value parameters by combining the output of machine-learning models and domain knowledge (e.g., input obtained from a graphical user interface). Embodiments disclosed herein may be implemented to use the learned technical entity patterns and related technical entity value parameters to extract information from unstructured technical reports and generate structured technical reports. These automated and semi-automated processes facilitate business intelligence and data analytics applications in an efficient, objective, and consistent manner as compared with previously known manual techniques.

Embodiments disclosed herein incorporate machine learning models that may be interleaved together to extract technical entities and/or obtain the logical relationships among technical entities. An example solution may include extracting possible patterns (entity pairs) based on the natural language processing techniques, filtering noisy pairs in accordance with a set of rules based on language semantics and domain knowledge, and storing extracted entity pairs in a hashing data structure to support the pattern matching operation in a hierarchical manner. In some examples, pattern matching may include performing pattern recognition. Examples may also include performing a pattern matching operation and applying an enhanced learning mechanism based on input from a graphical user interface.

The present disclosure provides methods for addressing dynamic report conversion tasks involving varying content structures and diverse types of information extraction specifications through a reinforcement learning mechanism, which can bring interaction between the model learning processing and domain knowledge (e.g., obtained from a graphical user interface. For example, users may provide input and correction to the process in real-time to train and refine both the pattern identification and the pattern matching algorithm. The pattern matching algorithm may downgrade weights corresponding to learned patterns that deviate from the user selected patterns, resulting in a dynamic and adaptive learning system.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 4 illustrates an example pattern identification algorithm by extracting patterns from n-gram lists generated from unstructured technical reports, consistent with embodiments disclosed herein.

Figure 1:
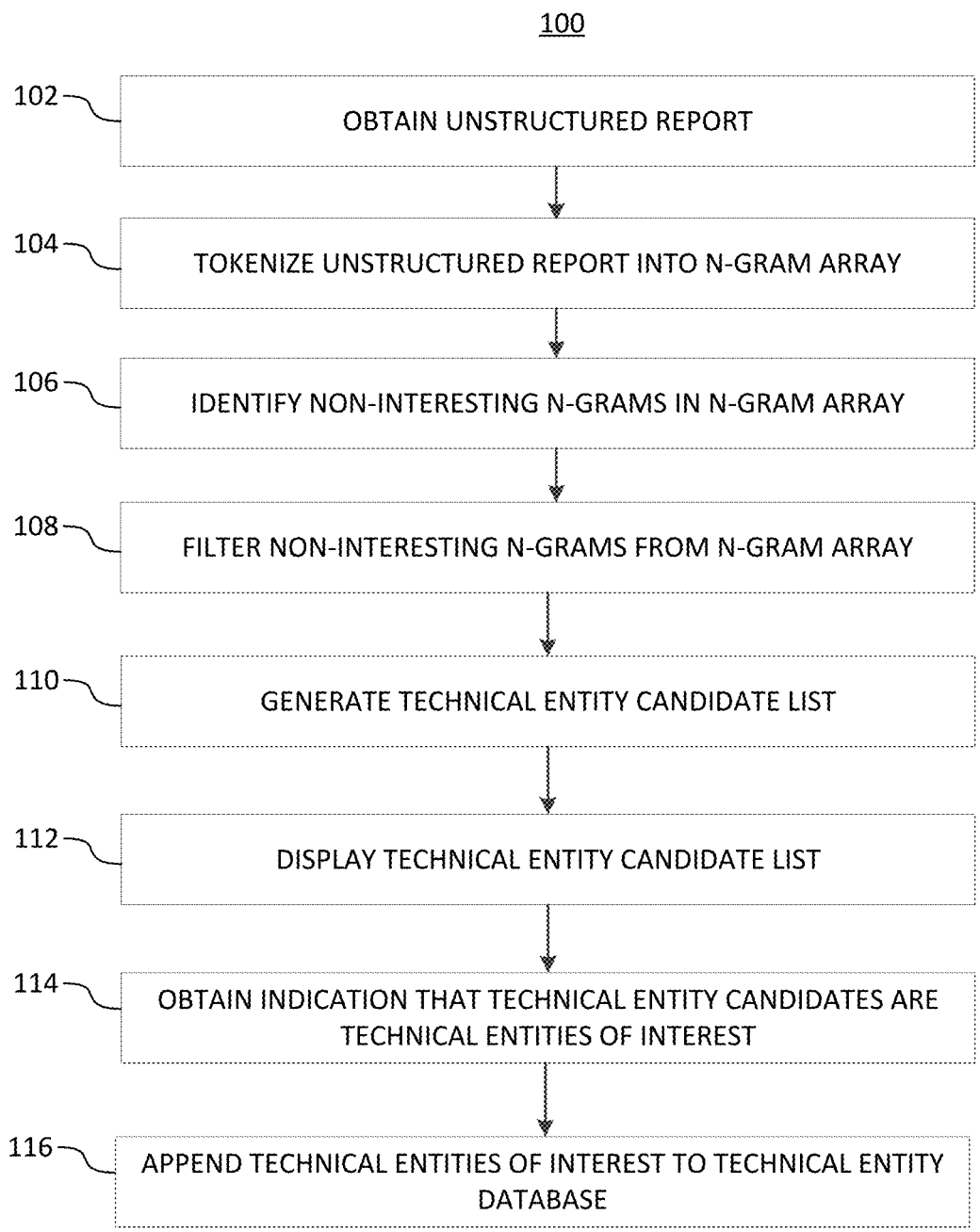
FIG. 1 is a flow chart illustrating a method for identifying technical entities in an unstructured technical report, consistent with embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Embodiments of the present disclosure provide systems and methods for converting unstructured technical reports to structured technical reports utilizing machine learning techniques. By doing so, data and information of interest may be sourced from the documents, identified and categorized, for example, in a database. Technical reports may include reports that contain and disclose technical information, such as engineering operation reports, experimental report, etc. Unstructured technical reports include engineering reports written in paragraph form and/or prose. In some examples, unstructured reports include figures, graphs, charts, photographs, or other unstructured content. Example technical reports may include reports that reflect operational and environmental data collected from an engineering system. Technical reports may reflect information to users by providing technical entity names and corresponding values. For example, a technical entity may be an engineering parameter or metric field, such as pressure, length, width, stress, force, temperature, or other types of engineering fields.

Technical entities may have corresponding technical entity value parameters. Technical entity value parameters may be values that correspond to the technical entities. In some examples, multiple technical entity values may correspond to the same technical entity, e.g., if multiple measurements are taken at different operation stage, or at different operating locations for an engineering system. Accordingly, a list of technical entities and corresponding technical entity value parameters may be structured as an array.

Embodiments of the present disclosure provide a computer-implemented, machine learning-based method of converting an unstructured technical report into a structured technical report. The method may include obtaining, from a data store, a first unstructured technical report and tokenizing, with a parser, the first unstructured technical report into a first n-gram array comprising multiple n-grams. Examples of the method may include identifying, with a natural language processing logical circuit, non-interesting n-grams from the first n-gram array based on common linguistic semantics and a determination that the non-interesting n-grams do not appear on a confirmed technical entity database and filtering non-interesting n-grams from the first n-gram array. Some examples of the method include generating, with the natural language processing logical circuit, a first technical entity candidate list from the filtered first n-gram array, displaying the technical entity candidate list on a graphical user interface, obtaining, from the graphical user interface, an indication that a first technical entity candidate is a first technical entity of interest, and appending the first technical entity of interest to the confirmed technical entity database.

In some example embodiments, the data store may include a document repository for multiple unstructured technical reports. The method may include iteratively identifying, with a pattern recognition logical circuit, one or more technical entity value parameters corresponding to the technical entity and appending the one or more first technical entity value parameters to the confirmed technical entity database. For example, the pattern matching logical circuit may include a machine learning model, such as Long Short Term Memory Network, Convolutional Neural Network, or distance supervision method. The pattern matching logical circuit may also be a pattern recognition logical circuit in some embodiments.

In some embodiments, the method includes generating, with a report generation logical circuit, a structured technical report based on comprising the first technical entity and the one or more first technical entity value parameters. Some embodiments may include obtaining, from the data store, a second unstructured technical report, tokenizing, with the parser, the second unstructured technical report into a second n-gram array, identifying, with the pattern matching logical circuit, one or more confirmed technical entities from the second n-gram array based on the confirmed technical entity database, and generating, with a report generation logical circuit, a structured technical report comprising the one or more confirmed technical entities.

In some embodiments, the method includes filtering non-interesting n-grams from the second n-gram array, generating an unconfirmed technical entity candidate list from the filtered second n-gram array, displaying, on a graphical user interface, the unconfirmed technical entity candidate list, obtaining, from the graphical user interface, an indication that an unconfirmed technical entity candidate is a confirmed technical entity of interest, and appending the confirmed technical entity of interest to the confirmed technical entity database.

Embodiments of the present disclosure provide a system for converting an unstructured technical report into a structured technical report. The system may include a data store, a natural language processing logical circuit, a pattern matching logical circuit, a parser, and a graphical user interface. The system may be configured to perform the computer-implemented methods disclosed herein. For example, the parser may be configured to tokenize unstructured technical reports into n-gram arrays of multiple n-grams. The natural language processing logical circuit may be configured to obtain, from the data store, one or more unstructured technical reports, identify non-interesting n-grams from an n-gram array based on common language usage of the non-interesting n-grams and a determination that the non-interesting n-grams do not appear on a confirmed technical entity database, filter non-interesting n-grams from the n-gram array, and generate a technical entity candidate list from the filtered n-gram array. The graphical user interface may display the technical entity candidate list and obtain an indication that a first technical entity candidate is a first technical entity of interest. The natural language processing logical circuit may also be configured to append the first technical entity of interest to the confirmed technical entity database.

FIG. 1 is a flow chart illustrating a method for identifying technical entities in an unstructured technical report. Referring to FIG. 1, a method 100 for identifying technical entities in an unstructured technical report may include obtaining an unstructured technical report at step 102 and tokenizing the unstructured technical report into an n-gram array at step 104. Tokenizing may include parsing the unstructured textual contents into n-gram sized groups. As used herein, an n-gram may be a string of words, characters, numerals, and/or punctuation which is n-units (i.e., characters, numerals, and/or punctuation) long. In some examples, the method may include identifying n-grams of pre-determined lengths. For example, the n-grams may be 2 characters, words, and/or numbers long, 3 characters, words, and/or numbers long, 4 characters, words, and/or numbers long, or longer. In some examples, the n-grams may fit with a range, e.g., between 2 and 10 characters, words, and/or numbers long, between 3 and 7 characters, words, and/or numbers long, between 3 and 10 characters, words, and/or numbers long, between 3 and 5 characters, words, and/or numbers long, or other ranges as may be used to provide sufficient n-gram length for the pattern matching algorithms described herein. In some examples, the method may include identifying n-grams of varying lengths. The length, or range of lengths of the n-grams may be tuned by a user via input to a graphical user interface. In some examples, the length, or range of lengths of the n-grams may be coded into the system, or learned through a machine learning algorithm.

Tokenizing the unstructured report into n-grams may include parsing the unstructured report using a parser as disclosed herein. The tokenized n-grams may be stored in a data structure in a data store, e.g., in an n-gram array. The n-gram array may include a list of identified n-grams in one dimension. The n-gram array may include additional dimensions, such as n-grams of varying lengths, n-grams corresponding to a confirmed entity list, n-grams with non-interesting n-grams filtered out, n-gram occurrence frequency (i.e., the number of times the same n-gram appears in the technical report, or in a reference document or data source), or other information relating to the tokenized list of n-grams.

Still referring to FIG. 1, method 100 may include identifying non-interesting n-grams in the n-gram array at step 106. Non-interesting n-grams are n-grams that are not likely to be technical entities because they are used in common language (e.g., as identified in a common language corpus, such as a dictionary or other common language data source) and they do not already appear on a technical entity candidate list which is created through a training process. For example, non-interesting n-grams may be n-grams that are known to have little or no technical relevance, such as nonce terms, conjunctions, white space, punctuation, or other terms or character strings that have been identified as carrying having little to no technical relevance. In some examples, a non-interesting n-gram list may be maintained in a database. In some examples, n-grams which already appear on a technical entity candidate list or confirmed list of technical entities may be ruled out as being non-interesting n-grams. Identification of the non-interesting n-grams may be performed by a natural language processing logical circuit as disclosed herein. Method 100 may include filtering the identified non-interesting n-grams from the n-gram array at step 108.

Method 100 may include generating a technical entity candidate list at step 110. The generation of the technical entity candidate list may be performed by the natural language processing logical circuit. For example, the technical entity candidate list may be a list of predicted technical entity candidates. A predicted technical entity candidate may include one or more n-grams, or strings of n-grams, selected from the n-gram array or the filtered n-gram array.

The natural language processing logical circuit may assemble technical entity candidates by processing n-grams from the n-gram array or filtered n-gram array, for example, by concatenating n-grams that appear adjacent to or in proximity to each other from the unstructured technical report, and/or by applying predicted corrections to the n-grams to more closely resemble known technical entities. In some examples, method 100 may include probabilistically predicting whether an n-gram, or series of n-grams corresponds to a technical entity by applying a pattern matching model using a pattern matching logical circuit as disclosed herein.

In some examples, the pattern matching logical circuit may be configured to apply a machine learning model to determine whether an n-gram or series of n-grams corresponds to a known technical entity. The technical entity candidate list may include processed n-grams or series of n-grams (e.g., processed to appear as a potential technical entity) for which the probability of corresponding to a known technical entity is above a predetermined threshold probability level. In some examples, the predetermined threshold probability level may be tuned through the graphical user interface.

Still referring to FIG. 1, method 100 may include displaying the technical entity candidate list on a graphical user interface at step 112 and obtaining an indication that one or more technical entity candidates are technical entities of interest from the graphical user interface at step 114. Confirmed technical entities of interest may be appended to a confirmed technical entity database at step 116. Steps 112 through 116 provide a mechanism for providing a predicted list of technical entities to a user through the graphical user interface, and enabling the user to refine the model by identifying which predicted technical entities are actually technical entities of interest, and thus should appear in the structured version of the technical report. The pattern matching logical circuit may then be tuned, refined, and learn to make better predictions by confirming which of its previous predictions were correct, and which were incorrect. The steps shown in FIG. 1 may be repeated to further refine the pattern matching model applied by the pattern matching logical circuit.

Figure 2:
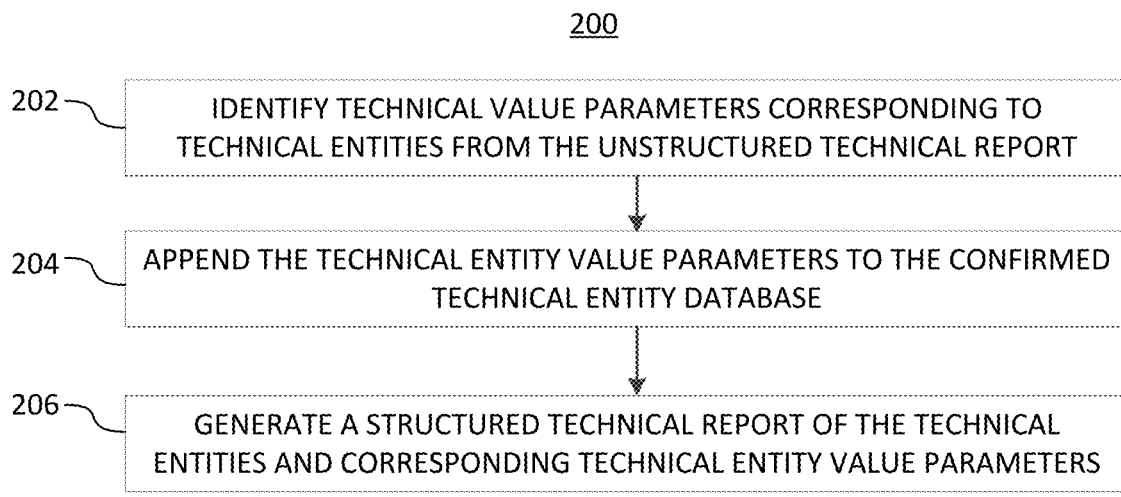
FIG. 2 is a flow chart illustrating a method for identifying technical value parameters corresponding to the identified technical entities, consistent with embodiments disclosed herein.

FIG. 2 is a flow chart illustrating a method 200 for identifying technical value parameters corresponding to the identified technical entities. Method 200 may include identifying technical value parameters corresponding to technical entities from the unstructured technical report at step 200 and appending the technical entity value parameters to the confirmed technical entity database at step 204. For example, technical entity value parameters may be values that correspond to the technical entity. The technical entity value parameters may be quantitative or qualitative. In some examples, multiple technical entity value parameters may be identified for a given technical entity, e.g., because the technical entity value parameters are obtained at different points in time or from different geospatial regions. Technical entity value parameters may be identified based on their proximity to the n-gram(s) which correspond to a given technical entity in the unstructured technical report, and/or based on context model.

As an illustrative example, the technical entity for "pressure" may appear in the unstructured technical report in a sentence that says: "We identified the pressure at the first valve to be 100 kPa at time=0 seconds, and to be 110 kPa at time=30 seconds." The sentence might be tokenized and filtered, and then identify the word "pressure" as a technical entity candidate, with the technical entity value parameters of 100 kPa at time=0 s and 110 kPa at time=30 s.

In some embodiments, method 200 may include generating a structured technical report of the technical entities and corresponding technical entity value parameters at step 206. For example, a structured technical report may be a table with technical entities organized in rows and corresponding technical entity value parameters organized in columns, with each row including the technical entity in the first column, and corresponding technical entity value parameters in subsequent columns on the same row. Other formats of structured technical report may be generated as would be appreciated by one of skill in the art.

Figure 3:
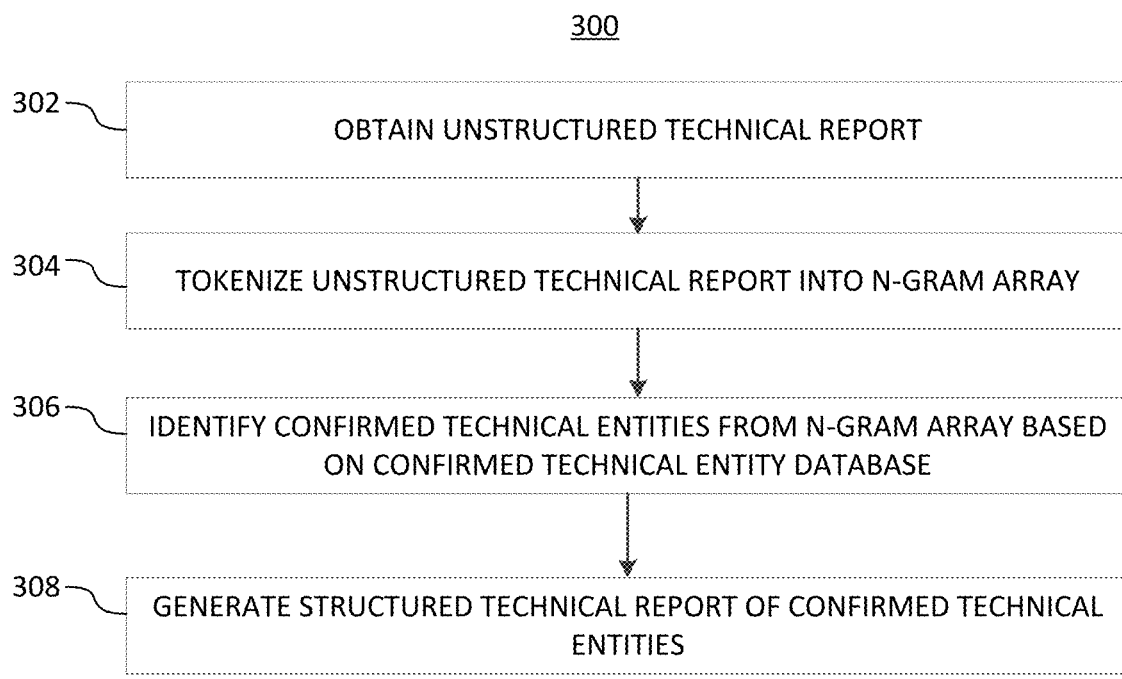
FIG. 3 is a flow chart illustrating a method for generating a structured technical report based on technical entities and corresponding technical entity value parameters identified in the unstructured technical report, consistent with embodiments disclosed herein.

FIG. 3 is a flow chart illustrating a method 300 for generating a structured technical report based on technical entities and corresponding technical entity value parameters identified in the unstructured technical report. Referring to FIG. 3, method 300 may include obtaining an unstructured technical report at step 302 and tokenizing the unstructured technical report into an n-gram array at step 304. Method 300 may also include identifying confirmed technical entities from the n-gram array based on the confirmed technical entity database at step 306. In some embodiments, identifying confirmed technical entities from the n-gram array may include applying a pattern matching algorithm to the n-grams in the n-gram array using a pattern matching logical circuit as disclosed herein.

The n-grams may be compared with confirmed technical entities in the confirmed technical entity database. If the pattern matching logical circuit determines that the n-gram (or series of n-grams) falls within a probabilistic threshold of being a match with a confirmed technical entity, then the pattern matching logical circuit may identify the n-gram (or series of n-grams) as a confirmed technical entity. If the pattern matching logical circuit determines that the n-gram (or series of n-grams) falls outside of a probabilistic threshold of being a match with a confirmed technical entity, then the pattern matching logical circuit may ignore the n-gram (or series of n-grams) or may include the n-gram (or series of n-grams) on a technical entity candidate list for manual review through the graphical user interface.

In some examples, the probabilistic threshold may be about 80%. In some examples, the probabilistic threshold may be greater than about 50%. Other probabilistic thresholds may be used or tuned via the graphical user interface, or hard coded into the pattern matching logical circuit, or can be learned via a machine learning model.

Method 300 may include generating a structured technical report of confirmed technical entities at step 308. The structured technical report may also include corresponding technical entity value parameters.

In some embodiments, method 100, method 200, and/or method 300 may be iterated multiple times to refine and train the pattern matching model and/or pattern recognition model applied by the pattern matching logical circuit. Through each iteration, the list of confirmed technical entities may be refined to improve filtering and either include or exclude potential technical entity candidates based on the pattern matching model applied by the pattern matching logical circuit.

In some examples, the pattern matching model applied by the pattern matching logical circuit may be a machine learning model, such as a convolutional neural network, a logistic regression, a decision tree, or other machine learning model. In some examples, the training data set for the machine learning algorithm may be a set of unstructured technical reports which are manually iterated through method 100, method 200, and/or method 300. In some examples, the pattern matching logical circuit may apply a set of algorithms and/or machine learning models to match diverse types of patterns that may include strings characterized as a planar structure or a context tree encoded as a hierarchical structure. Refining and/or training the machine learning model may include obtaining and applying domain knowledge from users via a graphical user interface, and or leverage domain knowledge systematically in the reinforcement learning framework.

Figure 4:
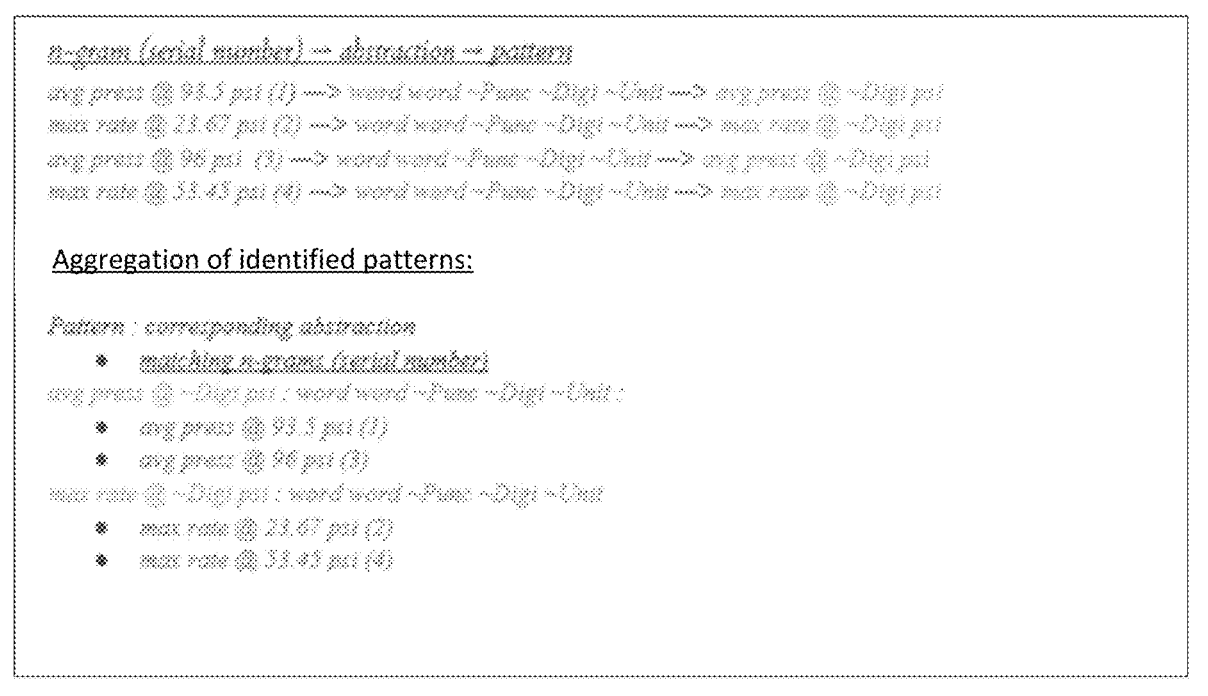

FIG. 4 illustrates an example pattern matching algorithm applied to a group of technical entities and technical entity value parameters, e.g., to perform pattern abstraction. As illustrated in FIG. 4, one or more n-grams may be obtained and abstracted into identified patterns (i.e., word-word-punctuation-digits-units). As shown in the example, similar patterns may be associated and/or aggregated into a common pattern structure.

Figure 5A:
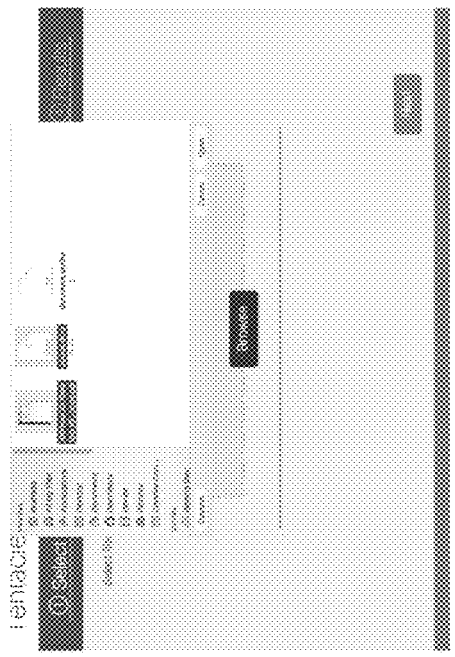
FIG. 5A is an example screen from an example graphical user interface for selecting unstructured technical reports for conversion to structured technical reports, consistent with embodiments disclosed herein.
Figure 5B:
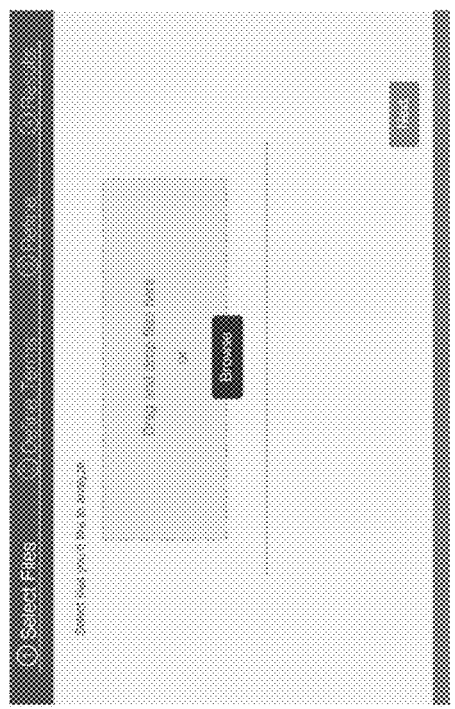
FIG. 5B is an example screen from an example graphical user interface for selecting unstructured technical reports for conversion to structured technical reports, consistent with embodiments disclosed herein.
Figure 5C:
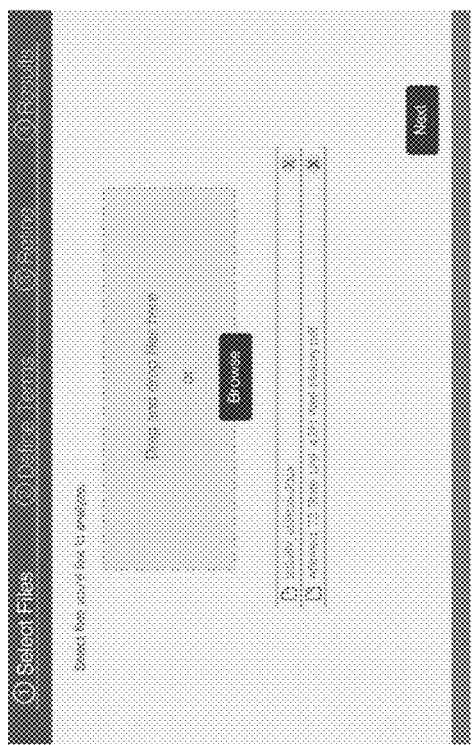
FIG. 5C is an example screen from an example graphical user interface for selecting unstructured technical reports for conversion to structured technical reports, consistent with embodiments disclosed herein.
Figure 6B:
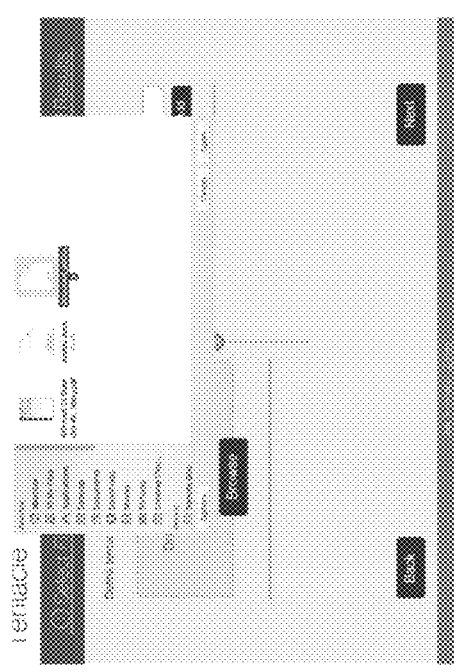
FIG. 6B is an example screen from an example graphical user interface for identifying and defining technical entities extracted from unstructured technical reports for conversion to structured technical reports, consistent with embodiments disclosed herein.
Figure 6D:
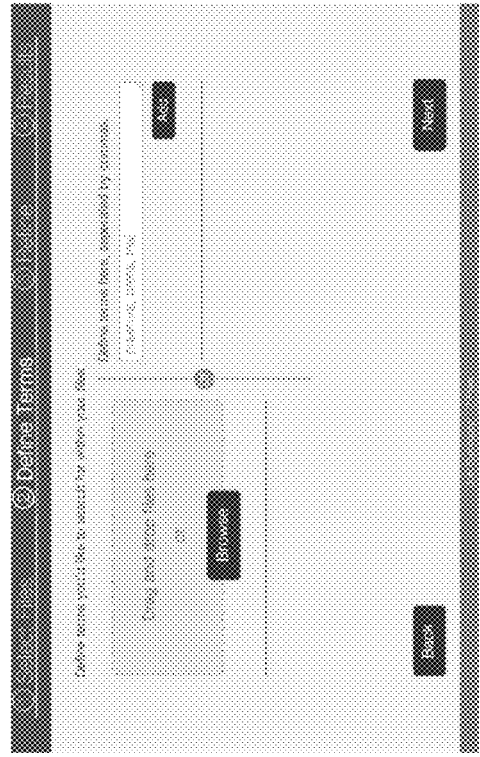
FIG. 6D is an example screen from an example graphical user interface for identifying and defining technical entities extracted from unstructured technical reports for conversion to structured technical reports, consistent with embodiments disclosed herein.
Figure 6A:
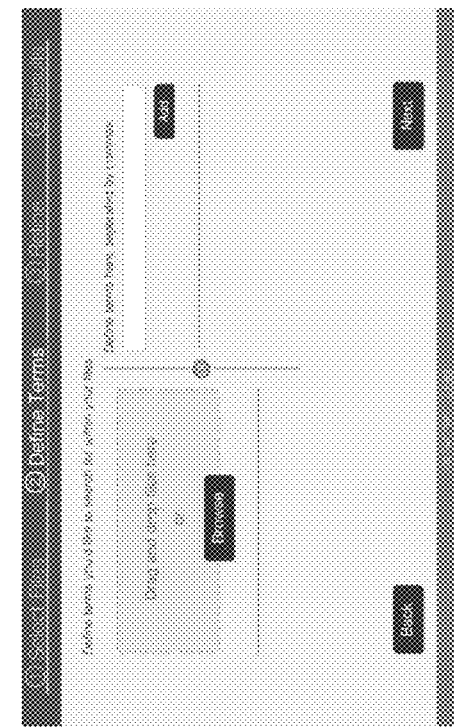
FIG. 6A is an example screen from an example graphical user interface for identifying and defining technical entities extracted from unstructured technical reports for conversion to structured technical reports, consistent with embodiments disclosed herein.
Figure 6C:
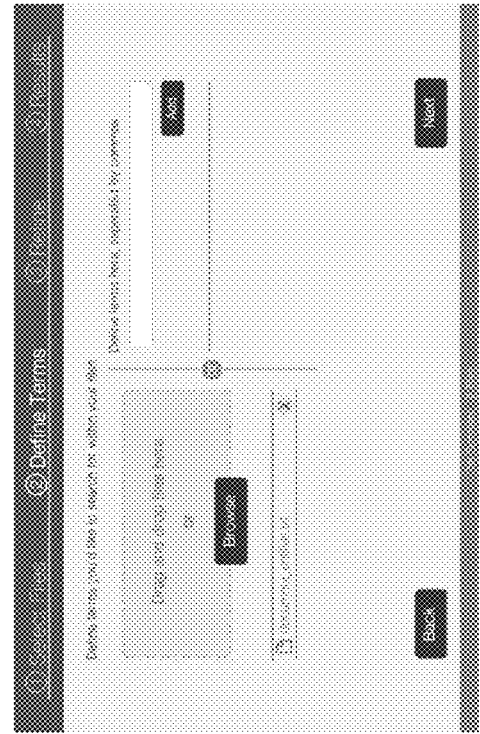
FIG. 6C is an example screen from an example graphical user interface for identifying and defining technical entities extracted from unstructured technical reports for conversion to structured technical reports, consistent with embodiments disclosed herein.
Figure 6E:
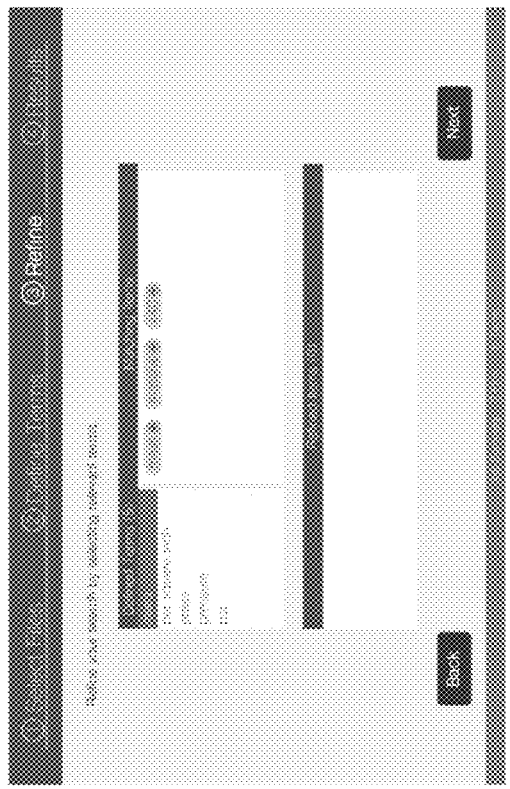
FIG. 6E is an example screen from an example graphical user interface for identifying and defining technical entities extracted from unstructured technical reports for conversion to structured technical reports, consistent with embodiments disclosed herein.

FIGS. 5A-5C illustrate an example graphical user interface for selecting unstructured technical reports for conversion to structured technical reports. FIGS. 6A-6E illustrate an example graphical user interface for identifying and defining technical entities extracted from unstructured technical reports for conversion to structured technical reports. As illustrated in FIG. 6E, the graphical user interface may enable a user to define terms (e.g., technical entities) to seed the pattern matching logical circuit with a list of known technical entities.

Figure 6F:
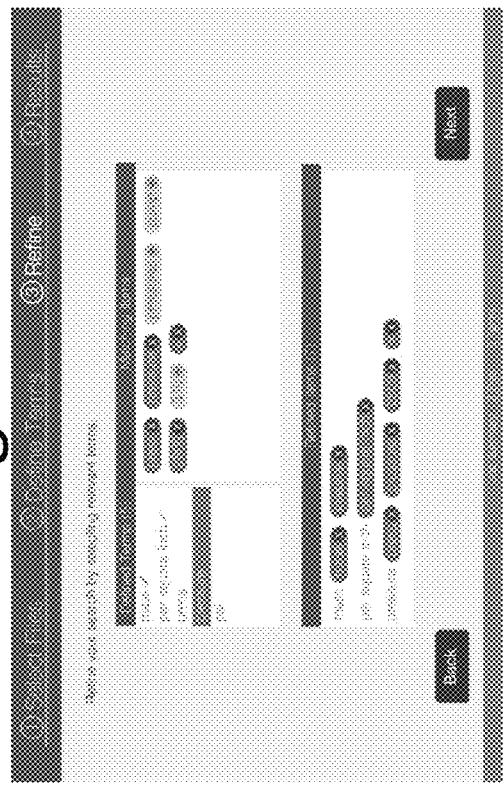
FIG. 6F is an example screen from an example graphical user interface for refining a list of identified technical entities extracted from unstructured technical reports for conversion to structured technical reports, consistent with embodiments disclosed herein.
Figure 6G:
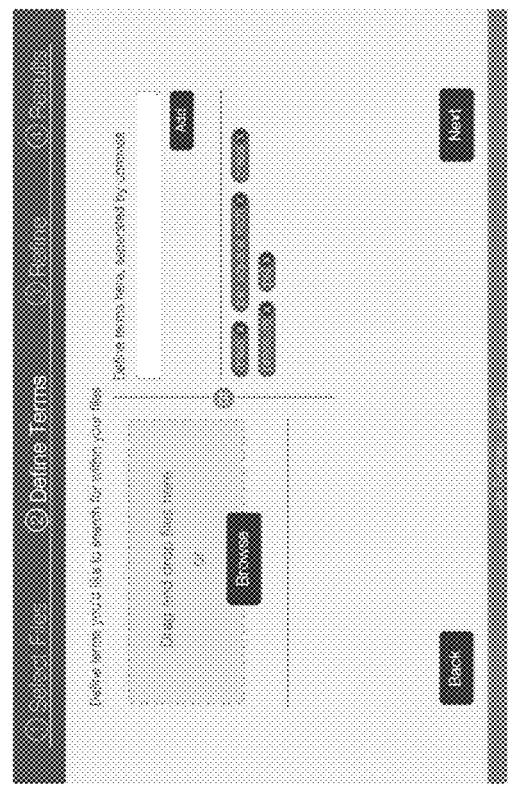
FIG. 6G is an example screen from an example graphical user interface for refining a list of identified technical entities extracted from unstructured technical reports for conversion to structured technical reports, consistent with embodiments disclosed herein.
Figure 6H:
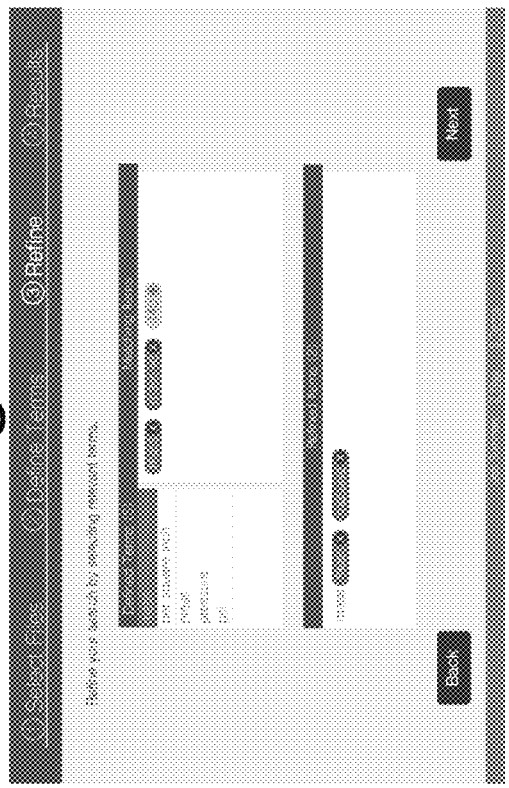
FIG. 6H is an example screen from an example graphical user interface for refining a list of identified technical entities extracted from unstructured technical reports for conversion to structured technical reports, consistent with embodiments disclosed herein.

FIGS. 6F-6H identify an example graphical user interface for refining the list of confirmed technical entities extracted from unstructured technical reports for conversion to structured technical reports. As illustrated in FIG. 6F, the graphical user interface may enable the user to add additional terms that were identified by the pattern matching logical circuit as being technical entity candidates, and enable the user to confirm that the technical entity candidate(s) (e.g., mass and massive) is a confirmed technical entity.

Figure 7:
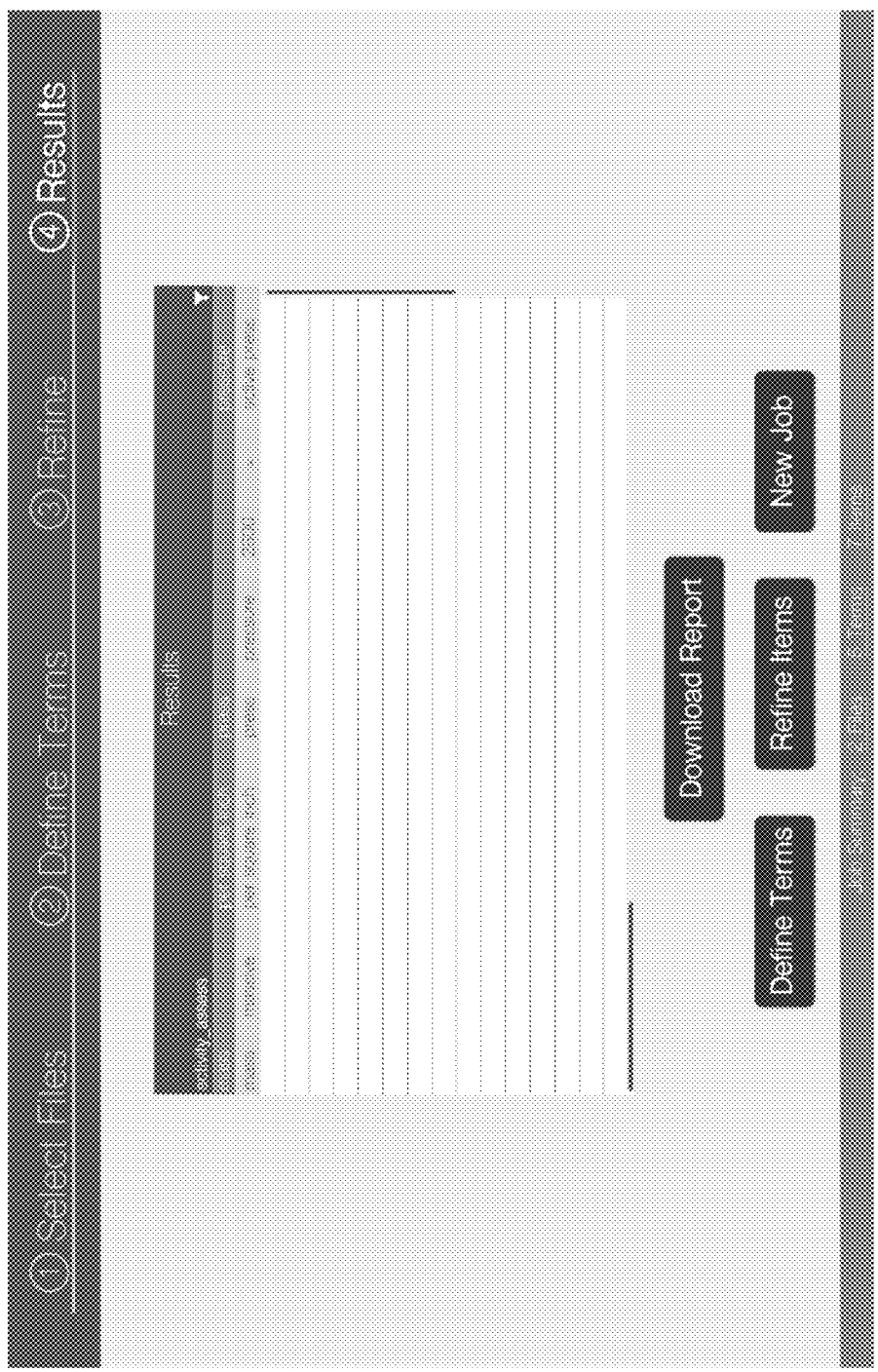
FIG. 7 is an example screen from an example graphical user interface for displaying a list of identified technical entities extracted from unstructured technical reports for conversion to structured technical reports, consistent with embodiments disclosed herein.

FIG. 7 illustrates an example graphical user interface for displaying a list of identified technical entities extracted from unstructured technical reports for conversion to structured technical reports.

Figure 8:
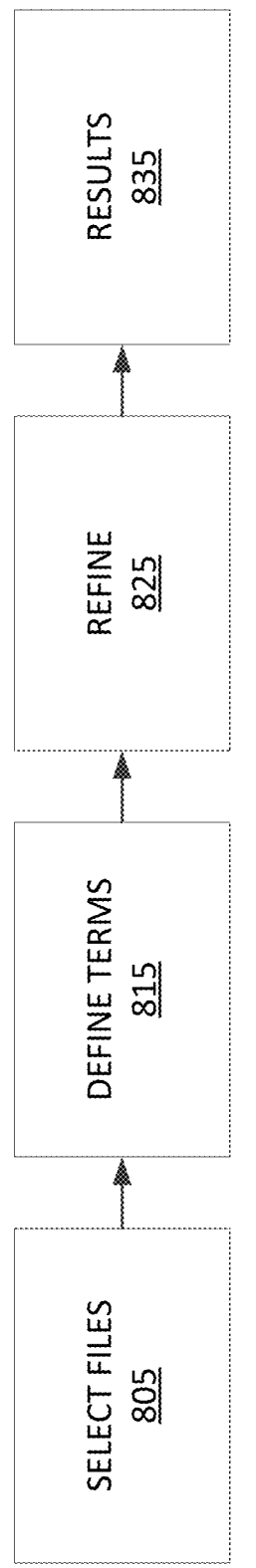
FIG. 8 is a flow chart illustrating an example graphical user interface workflow for converting unstructured technical reports to structured technical reports, consistent with embodiments disclosed herein.

FIG. 8 is a flow chart illustrating an example workflow for implementation by a graphical user interface for converting unstructured technical reports to structured technical reports. As illustrated in FIG. 8, an example workflow for converting unstructured technical reports into structured technical reports using a graphical user interface may include selecting an unstructured technical report file at step 805. Step 805 may include the application of method 100 as disclosed herein. The example workflow may include defining technical entity terms (either manually or through automated identification of technical entity candidates) at step 815. The example workflow may also include refining the pattern matching algorithm at step 825. Step 825 may include an iterative application of method 100, method 200, and/or method 300. The example workflow may further include displaying the results of the pattern matching algorithm for manual review through the graphical user interface. Step 835 may also include displaying a list of identified technical entities extracted from the unstructured technical report file for conversion to structured technical reports. The example workflow illustrated in FIG. 8 may be applied using a graphical user interface similar to the graphical user interface illustrated in FIGS. 5-7.

Figure 9:
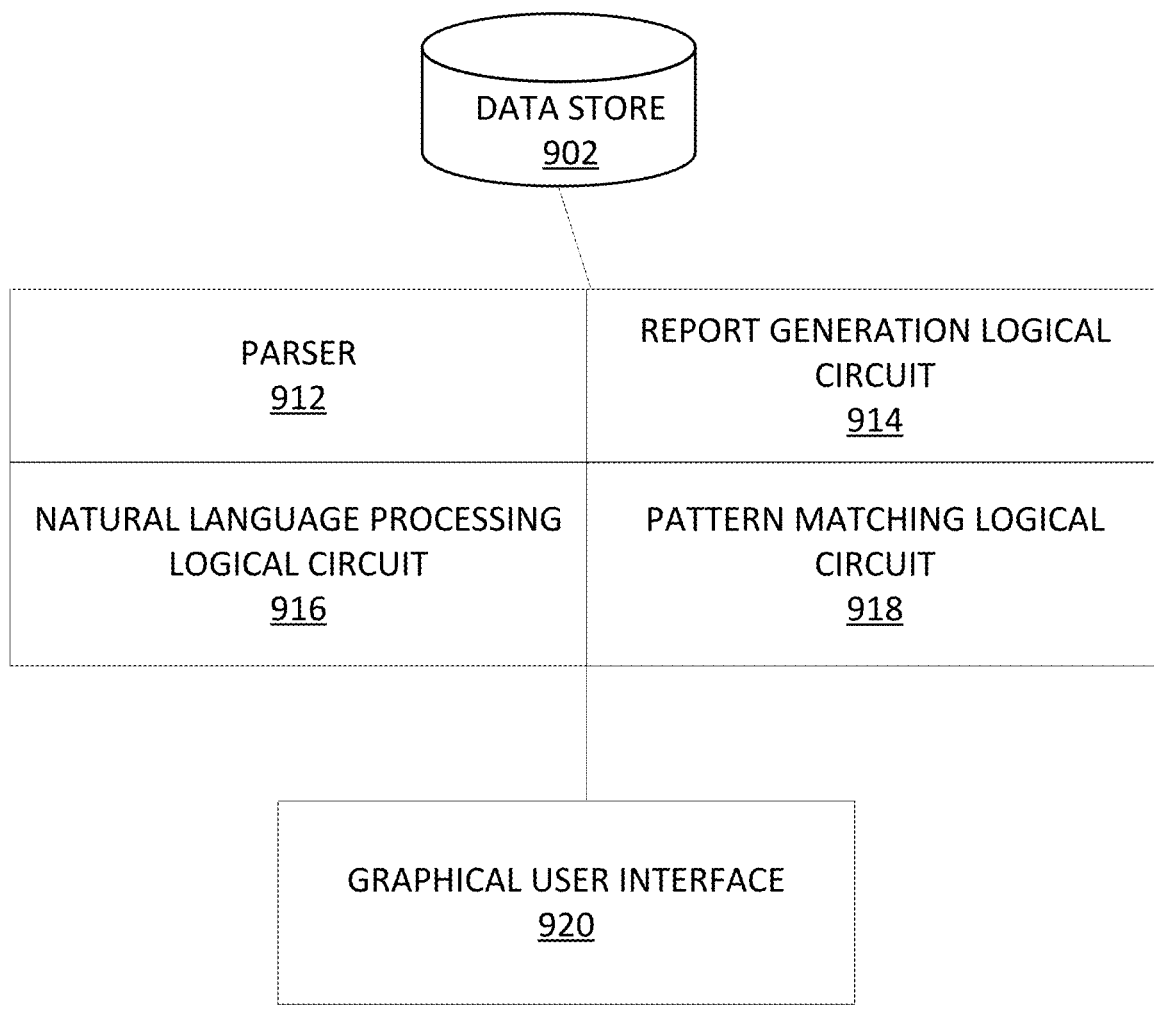
FIG. 9 illustrates an example system for converting unstructured technical reports to structured technical reports, consistent with embodiments disclosed herein.

FIG. 9 illustrates an example system for converting unstructured technical reports to structured technical reports. As illustrated in FIG. 9, a system for converting unstructured technical reports to structured technical reports may include a data store 902. Data store 902 may include a database. Data store 902 may be local data storage, a storage area network or network attached storage, and/or cloud-based data storage. In some embodiments the system may include a parser 912. For example, parser 912 may include a processor and a non-transitory memory with computer executable instructions embedded thereon, wherein the computer executable instructions are configured to tokenize content (e.g., an unstructured technical report) into an n-gram array.

Still referring to FIG. 9, a system for converting unstructured technical reports into structured technical reports may include a report generation logical circuit 914. For example, report generation logical circuit 914 may include a processor and a non-transitory memory with computer executable instructions embedded thereon, wherein the computer executable instructions are configured to generate a structured technical report using a list of confirmed technical entities and corresponding technical entity value parameters, consistent with method 200 and/or method 300. Report generation logical circuit 914 may store the structured technical report on data store 902 and or cause graphical user interface 920 to display the structured technical report.

Still referring to FIG. 9, a system for converting unstructured technical reports into structured technical reports may include a natural language processing logical circuit 916. For example, natural language processing logical circuit 916 may include a processor and a non-transitory memory with computer executable instructions embedded thereon, wherein the computer executable instructions are configured to apply a natural language processing algorithm to the n-gram array to filter out non-interesting n-grams and identify a list of technical entity candidates. In some examples, natural language processing logical circuit 916 may perform steps disclosed in method 100, method 200, and/or method 300.

Still referring to FIG. 9, a system for converting unstructured technical reports into structured technical reports may include a pattern matching logical circuit 918. For example, pattern matching logical circuit 918 may include a processor and a non-transitory memory with computer executable instructions embedded thereon, wherein the computer executable instructions are configured to apply a pattern matching model to the n-gram array to identify technical entity candidates. For example, the pattern matching model may be a machine learning model such as a convolutional neural network, logistic regression, decision tree, or other machine learning and/or pattern matching algorithm. In some examples, pattern matching logical circuit 918 may perform steps disclosed in method 100, method 200, and/or method 300.

Still referring to FIG. 9, a system for converting unstructured technical reports into structured technical reports may include a graphical user interface 920. For example, graphical user interface 920 may include components similar to the example graphical user interface illustrated in FIGS. 5-7.

Figure 10:
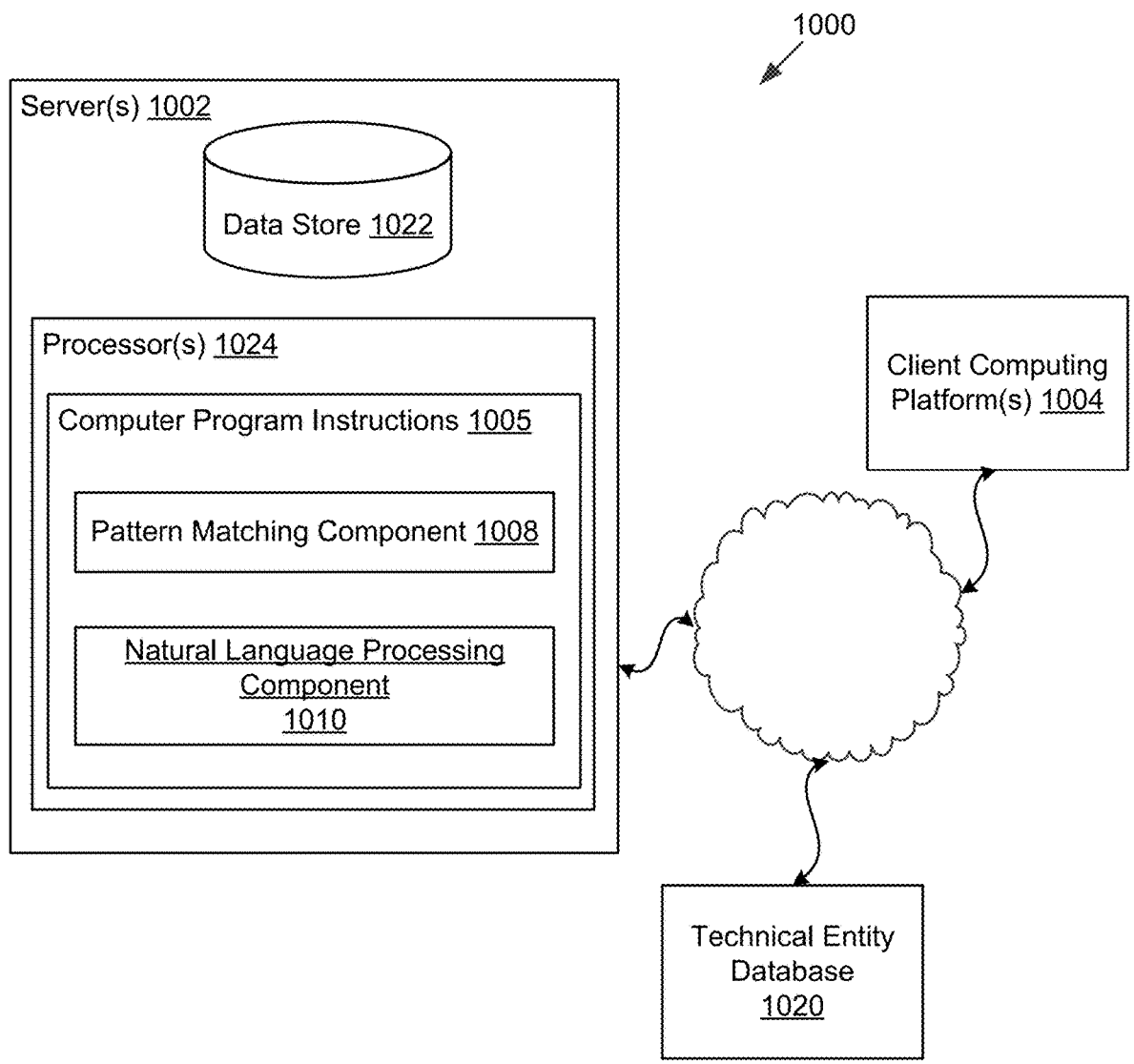
FIG. 10 illustrates an example system for converting unstructured technical reports to structured technical reports, consistent with embodiments disclosed herein.

FIG. 10 is a diagram illustrating a system for converting unstructured technical reports into structured technical reports. For example, a system for converting unstructured technical reports into structured technical reports 1000 may include one or more servers 1002, one or more client computing platforms 1004, and a technical entity database 1020. The technical entity database 1020 may store lists of confirmed technical entities, n-gram arrays, pattern matching training models, pattern recognition training models, and/or unstructured technical reports that have been reviewed and converted to structured technical reports based on the identification of learned patterns.

Server 1002 may include one or more processors 1024 and one or more non-transitory memories with computer program instructions 1005 embedded thereon. The computer program instructions may include a pattern matching component 1008 and a natural language processing component 1010. In some examples, the pattern matching component 1008 may also be a pattern recognition component and/or a pattern abstraction component. Server 1002 may include a data store 1022. Data store 1022 may include a database.

The pattern matching component 1008 may include computer program instructions to cause processor 1024 to implement a method for matching learned patterns of n-grams, for example, as described herein with respect to FIGS. 1, 2, and 3. In some examples, pattern matching component 1008 may cause processor 1024 to apply a machine learning model to train data input in the data store 1022. The trained data may be sourced and implemented, for example, as described with respect to FIGS. 1, 2, and 3. Client computing platform(s) 1004 may include desktop computers, laptop computers, tablet computers, handheld computers, smart phones, or other computing platforms capable of operating a client interface.

The natural language processing component 1010 may include computer program instructions to cause processor 1024 to implement a method for identifying and filtering the patterns of n-grams to remove non-interesting n-grams from the n-gram array for a given unstructured technical report, as described herein with respect to FIG. 1. After filtering the non-interesting n-grams from the n-gram array for a given unstructured technical report, the pattern matching component 1008 may identify technical entity candidates, present a list of technical entity candidates to client computing platforms 1004, and obtain indications confirming technical entity candidates as confirmed technical entities. Confirmed technical entities may be appended to technical entity database 1020.

As will be appreciated, the method as described herein may be performed using a computing system having machine executable instructions stored on a tangible medium. The instructions are executable to perform each portion of the method, either autonomously, or with the assistance of input from an operator.

Those skilled in the art will appreciate that the disclosed embodiments described herein are by way of example only, and that numerous variations will exist. The invention is limited only by the claims, which encompass the embodiments described herein as well as variants apparent to those skilled in the art. In addition, it should be appreciated that structural features or method steps shown or described in any one embodiment herein can be used in other embodiments as well.

Figure 11:
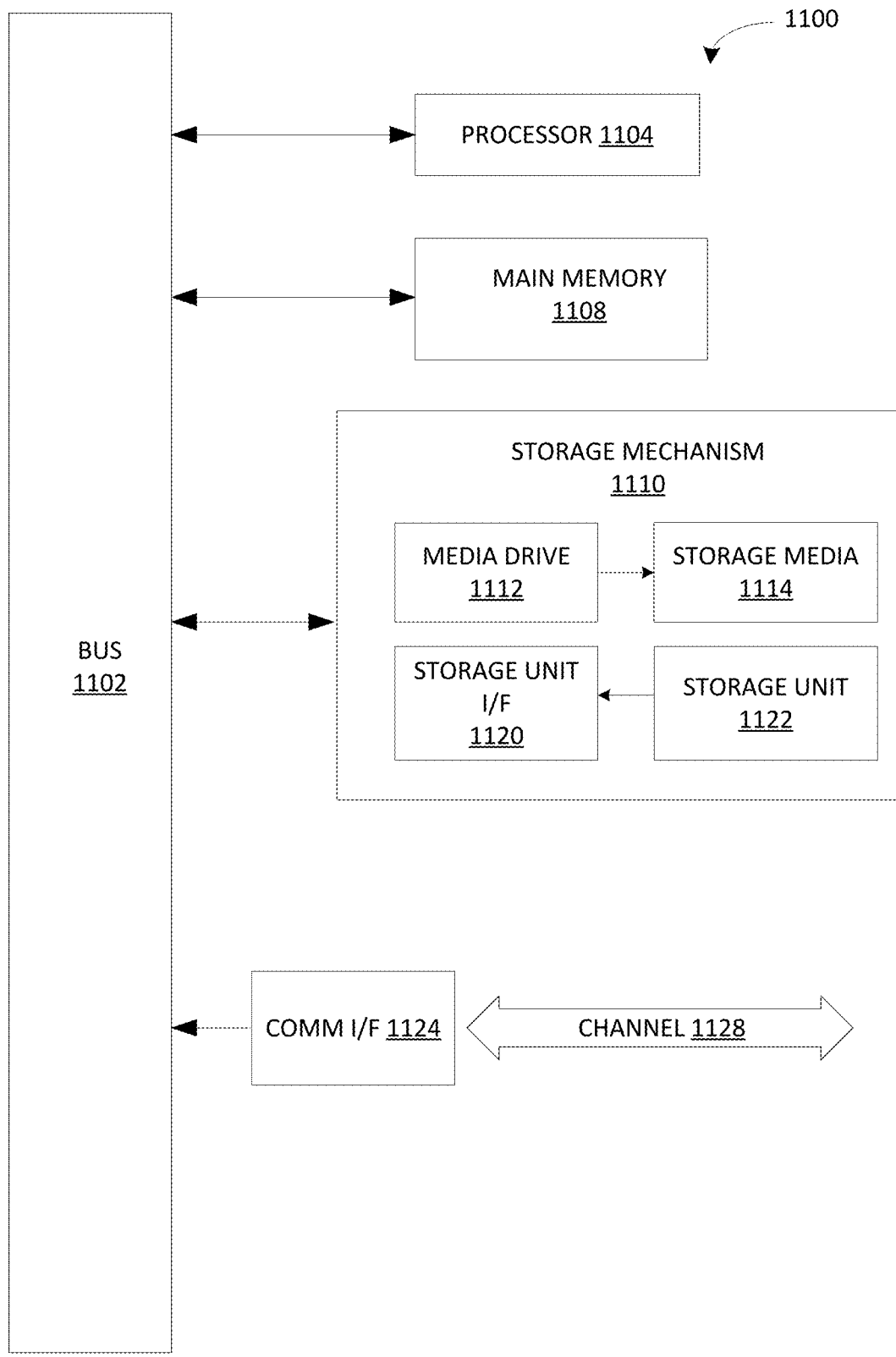
FIG. 11 illustrates an example computing system that may be used in implementing various features of embodiments of the disclosed technology.

As used herein, the terms logical circuit and component might describe a given unit of functionality that can be performed in accordance with one or more embodiments of the technology disclosed herein. As used herein, either a logical circuit or a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components, logical circuits, or components of the technology are implemented in whole or in part using software, in one embodiment, these software elements can be implemented to operate with a computing or logical circuit capable of carrying out the functionality described with respect thereto. One such example logical circuit is shown in FIG. 11. Various embodiments are described in terms of this example logical circuit 1100. After reading this description, it will become apparent to a person skilled in the relevant art how to implement the technology using other logical circuits or architectures.

Referring now to FIG. 11, computing system 1100 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Logical circuit 1100 might represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 1100 might include, for example, one or more processors, controllers, control components, or other processing devices, such as a processor 1104. Processor 1104 might be implemented using a general-purpose or special-purpose processing component such as, for example, a microprocessor, controller, or other control logic. In the illustrated example, processor 1104 is connected to a bus 1102, although any communication medium can be used to facilitate interaction with other components of logical circuit 1100 or to communicate externally.

Computing system 1100 might include one or more memory components, simply referred to herein as main memory 1108. For example, preferably random access memory (RAM) or other dynamic memory, might be used for storing information and instructions to be executed by processor 1104. Main memory 1108 might be used for storing temporary variables or other intermediate information during execution of instructions to be executed by processor 1104. Logical circuit 1100 might likewise include a read only memory ("ROM") or other static storage device coupled to bus 1102 for storing static information and instructions for processor 1104.

The computing system 1100 might include one or more various forms of information storage mechanism 1110, which might include, for example, a media drive 1112 and a storage unit interface 1120. The media drive 1112 might include a drive or other mechanism to support fixed or removable storage media 1114. For example, a hard disk drive, a floppy disk drive, a magnetic tape drive, an optical disk drive, a CD or DVD drive (R or RW), or other removable or fixed media drive might be provided. Accordingly, storage media 1114 might include, for example, a hard disk, a floppy disk, magnetic tape, cartridge, optical disk, a CD or DVD, or other fixed or removable medium that is read by, written to or accessed by media drive 1112. As these examples illustrate, the storage media 1114 can include a computer usable storage medium having stored therein computer software or data.

In alternative embodiments, information storage mechanism 1110 might include other similar instrumentalities for allowing computer programs or other instructions or data to be loaded into logical circuit 1100. Such instrumentalities might include, for example, a fixed or removable storage unit 1122 and an interface 1120. Examples of such storage units 1122 and interfaces 1120 can include a program cartridge and cartridge interface, a removable memory (for example, a flash memory or other removable memory component) and memory slot, a PCMCIA slot and card, and other fixed or removable storage units 1122 and interfaces 1120 that allow software and data to be transferred from the storage unit 1122 to logical circuit 1100.

Logical circuit 1100 might include a communications interface 1124. Communications interface 1124 might be used to allow software and data to be transferred between logical circuit 1100 and external devices. Examples of communications interface 1124 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1124 might typically be carried on signals, which can be electronic, electromagnetic (which includes optical) or other signals capable of being exchanged by a given communications interface 1124. These signals might be provided to communications interface 1124 via a channel 1128. This channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1108, storage unit 1120, media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 1100 to perform features or functions of the disclosed technology as discussed herein.

Although FIG. 11 depicts a computer network, it is understood that the disclosure is not limited to operation with a computer network, but rather, the disclosure may be practiced in any suitable electronic device. Accordingly, the computer network depicted in FIG. 11 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of an component, whether control logic or other components, can be combined in a single package or separately maintained and can be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented, machine learning-based method of converting an unstructured technical report into a structured technical report, the method comprising:
   receiving, at a graphical user interface, selection of a first unstructured technical report file for conversion to a first structured technical report;
   obtaining, from a data store, the first unstructured technical report file;
   tokenizing, with a parser, the first unstructured technical report file into a first n-gram array comprising multiple n-grams;
   identifying, with a natural language processing logical circuit, non-interesting n-grams from the first n-gram array, wherein identifying non-interesting n-grams from the first n-gram array comprises:
      comparing, with the natural language processing logical circuit, one of the multiple n-grams to terms in a common language corpus;
      comparing, with a pattern matching logical circuit, one of the multiple n-grams to a confirmed technical entity database, and wherein the confirmed technical entity database comprises pre-identified technical entities;
   filtering out non-interesting n-grams from the first n-gram array;
   generating, with the natural language processing logical circuit, a first technical entity candidate list from the filtered first n-gram array by processing n-grams from the filtered first n-gram array by concatenating n-grams that are in proximity to each other in the unstructured technical report, wherein the first technical entity candidate list comprises technical entities;
   displaying, on the graphical user interface, the technical entity candidate list;
   obtaining, from the graphical user interface, an indication that multiple technical entity candidates in the technical entity candidate list are multiple technical entities of interest;
   appending a first technical entity of interest of the multiple technical entities of interest to the confirmed technical entity database; and
   generating, with a report generation logical circuit, the first structured technical report, wherein the first structured technical report comprises the multiple technical entities of interest.

2. The method of claim 1, wherein the data store comprises a document repository comprising multiple unstructured technical reports.

3. The method of claim 1, further comprising:
   for the first technical entity of interest, identifying, with a pattern recognition logical circuit, one or more first technical entity value parameters corresponding to the first technical entity based on proximity to the first technical entity in the unstructured technical report;
   appending the one or more first technical entity value parameters to the confirmed technical entity database.

4. The method of claim 3, wherein the first structured technical report further comprises the one or more first technical entity value parameters.

5. The method of claim 3, further comprising:
   obtaining, from the data store, a second unstructured technical report file;
   tokenizing, with the parser, the second unstructured technical report file into a second n-gram array;
   identifying, with the pattern matching logical circuit, one or more confirmed technical entities from the second n-gram array based on the confirmed technical entity database; and
   generating, with the report generation logical circuit, a second structured technical report comprising the one or more confirmed technical entities.

6. The method of claim 5, further comprising:
   filtering non-interesting n-grams and confirmed technical entities from the second n-gram array;
   generating an unconfirmed technical entity candidate list from the filtered second n-gram array;
   displaying, on the graphical user interface, the unconfirmed technical entity candidate list;
   obtaining, from the graphical user interface, an indication that an unconfirmed technical entity candidate is a confirmed technical entity of interest; and
   appending the confirmed technical entity of interest to the confirmed technical entity database.

7. The method of claim 3, wherein the pattern matching logical circuit comprises a machine learning model.

8. The method of claim 3, wherein the pattern matching logical circuit further comprises a set of algorithms and machine learning models configured to match diverse types of patterns identified in strings extracted from the unstructured technical report, wherein the diverse types of patterns are characterized as planar structures or context tree encoded as hierarchical structures.

9. The method of claim 7, wherein the machine learning model comprises a convolutional neural network, a logistic regression, or a decision tree.

10. The method of claim 7, further comprising enhancing the machine learning model by injecting domain knowledge by obtaining indications that technical entity candidates are technical entities of interest.

11. The method of claim 3, further comprising generating, with the report generation logical circuit, a structured technical report comprising the first technical entity and the one or more first technical entity value parameters.

12. The method of claim 11, further comprising displaying, on the graphical user interface, the first structured technical report.

13. The method of claim 12, further comprising obtaining indications from the graphical user interface that one or more technical entities or technical entity value parameters is incorrect.

14. A system for converting an unstructured technical report into a structured technical report, the system comprising:
a data store, a natural language processing logical circuit, a pattern matching logical circuit, a parser, a graphical user interface, and a report generation logical circuit, wherein:
the parser is configured to tokenize a first unstructured technical report file into a first n-gram array comprising multiple n-grams;
the natural language processing logical circuit comprises a processor and a non-transitory memory with computer executable instructions embedded thereon, the computer executable instructions configured to:
obtain, from the data store, the first unstructured technical report file;
identify non-interesting n-grams from a first n-gram array, wherein identifying non-interesting n-grams from the first n-gram array comprises:
comparing, with the natural language processing logical circuit, one of the multiple n-grams to terms in a common language corpus;
comparing, with the pattern matching logical circuit, one of the multiple n-grams to a confirmed technical entity database, and wherein the confirmed technical entity database comprises pre-identified technical entities;
filter out non-interesting n-grams from the first n-gram array; and
generate a first technical entity candidate list from the filtered first n-gram array by processing n-grams from the filtered first n-gram array by concatenating n-grams that are in proximity to each other in the unstructured technical report, wherein the first technical entity candidate list comprises technical entities;
the graphical user interface is configured to:
receive a selection of the first unstructured technical report file for conversion to a first structured technical report;
display the technical entity candidate list;
obtain an indication that multiple technical entity candidates in the technical entity candidate list are multiple technical entities of interest;
the natural language processing logical circuit is further configured to append a first technical entity of interest of the multiple technical entities of interest to the confirmed technical entity database; and
the report generation logical circuit is configured to generate the first structured technical report, wherein the first structured technical report comprises the multiple technical entities of interest.

15. The system of claim 14, wherein the pattern matching logical circuit is configured to:
for the first technical entity of interest, identify one or more first technical entity value parameters corresponding to the first technical entity based on proximity to the first technical entity in the unstructured technical report;
the natural language processing logical circuit is further configured to append the one or more first technical entity value parameters to the confirmed technical entity database.

16. The system of claim 15, wherein the first structured technical report further comprises one or more first technical entity value parameters.

17. The system of claim 15, wherein:
the natural language processor is further configured to obtain, from the data store, a second unstructured technical report file;
the parser is further configured to tokenize the second unstructured technical report file into a second n-gram array;
the pattern matching logical circuit is configured to identify one or more confirmed technical entities from the second n-gram array based on the confirmed technical entity database; and
and the report generation logical circuit is further configured to generate a second structured technical report comprising the one or more confirmed technical entities.

18. The system of claim 17, wherein the natural language processing logical circuit is further configured to:
filter non-interesting n-grams and confirmed technical entities from the second n-gram array;
generate an unconfirmed technical entity candidate list from the filtered second n-gram array;
provide the unconfirmed technical entity candidate list to the graphical user interface;
obtain, from the graphical user interface, an indication that an unconfirmed technical entity candidate is a confirmed technical entity of interest; and
append the confirmed technical entity of interest to the confirmed technical entity database in the data store.

19. The system of claim 15, wherein the pattern matching logical circuit comprises a machine learning model.

20. The system of claim 15, wherein:
the graphical user interface is configured to display the first structured technical report;
the natural language processing logical circuit is further configured to obtain indications from the graphical user interface that one or more technical entities or technical entity value parameters is incorrect; and
the pattern matching logical circuit is further configured to train a machine learning model based on the indications obtained from the graphical user interface.

* * * * *